(12) United States Patent
Li et al.

(10) Patent No.: US 6,822,747 B1
(45) Date of Patent: Nov. 23, 2004

(54) METHODS AND APPARATUS FOR CHROMATIC DISPERSION COMPENSATION

(75) Inventors: Jainferg Li, Boulder, CO (US); Michael Rivera, Shrewsbury, MA (US); Edem Ibragimov, San Jose, CA (US)

(73) Assignee: Yafo Networks, Inc., Hanover, MD (US)

( * ) Notice: Subject to any disclaimer, the term of this patent is extended or adjusted under 35 U.S.C. 154(b) by 177 days.

(21) Appl. No.: 10/191,486

(22) Filed: Jul. 10, 2002

Related U.S. Application Data (60) Provisional application No. 60/304,294, filed on Jul. 10, 2001.

(51) Int. Cl.[7] ................................................ G01B 9/02
(52) U.S. Cl. ...................................................... 356/519
(58) Field of Search ................................ 356/73.1, 454, 356/519; 398/29, 81, 147

(56) References Cited

U.S. PATENT DOCUMENTS

| | | | | |
|---|---|---|---|---|
| 5,557,468 A | * | 9/1996 | Ip ................................ | 359/615 |
| 6,295,396 B1 | * | 9/2001 | Cao et al. ...................... | 385/24 |
| 6,487,342 B1 | * | 11/2002 | Wu et al. ....................... | 385/39 |
| 6,519,065 B1 | * | 2/2003 | Colbourne et al. ........... | 398/81 |
| 6,654,564 B1 | * | 11/2003 | Colbourne et al. .......... | 398/147 |

* cited by examiner

*Primary Examiner*—Samuel A. Turner
*Assistant Examiner*—Michael A. Lyons
(74) *Attorney, Agent, or Firm*—Brett Alten (57) ABSTRACT

Methods and apparatus for chromatic dispersion compensation are provided. The apparatus includes a Gires-Tournois etalon, an optical beam separator, a GTE controller, an optical distortion analyzer, and a feedback controller.

19 Claims, 10 Drawing Sheets

METHODS AND APPARATUS FOR CHROMATIC DISPERSION COMPENSATION

This application claims the benefit of U.S. Provisional Application Ser. No. 60/304,294 filed Jul. 10, 2001.

SUMMARY OF THE INVENTION

The present invention relates to methods and apparatus for chromatic dispersion compensation, and particularly for such compensation using an etalon, such as a Gires-Tournois etalon.

SUMMARY OF THE INVENTION

This invention provides chromatic dispersion compensation and apparatus that is effective over a wide range (such as from 0 km to about 100 km of SMF-28 fiber, which is equivalent to 0 to about 1700 picoseconds per nanometer) and that can reduce the bit error rate (hereinafter, "BER") for a known optical signal to noise ratio (hereinafter, "OSNR"), even when compared to the case where the transmitter and receiver are positioned back-to-back.

According to the invention, a notch filter is combined with any type of chromatic dispersion compensator. The notch filter can be integrated into an existing compensator component or added, as desired.

There are a number of possible approaches according to this invention. As explained more fully below, a chromatic dispersion compensator can include an etalon, such as a Gires-Tournois (hereinafter, a "GTE") etalon. In one approach, the GTE is thermally tuned. Alternatively, the GTE can be electrically tuned. The invention can also be used with devices that are not etalon-based, such as fiber Bragg grating-based devices. In yet another approach, the GTE can be entirely passive, such as by using an air gap with a low expansion spacer. Thus, it is not necessary to actively tune the GTE using a fixed optimal configuration.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Methods and apparatus for chromatic dispersion compensation are provided. A chromatic dispersion (hereinafter, "CD") compensator according to this invention can include a Gires-Tournois etalon (hereinafter, "GTE"), an optical beam separator, a GTE controller, an optical distortion analyzer, and a feedback controller.

An etalon according to this invention includes two substrates separated by a gap that has a substantially uniform thickness. The gap is normally filled with optical filler. The inner surfaces of the substrates are coated with reflective coatings. When the etalon is placed in a beam of substantially monochromatic light, multiple interferences occurs, forming circular fringes. As used herein, a GTE is an etalon that has a substantially constant spectral reflectance over a particular communications wavelength and that can generate frequency-dependent group delays. Preferably, the GTE should have a low optical loss.

The reflectivity of the first mirror surface (e.g., surface 107 of FIG. 1) determines the maximum amount of dispersion compensation that the GTE can provide. For example, a surface having a 50% reflectivity can give about 1100 $ps^2$ dispersion, which corresponds to a 50 km long conventional single mode fiber. Thus, longer fiberlengths can require relatively high first surface reflectivities. A high reflectivity, however, causes a narrowing of the bandwidth of a group delay curve, which in turn reduces the passband. As used herein, the term "passband" is the range of wavelengths that provides a reasonably constant chromatic dispersion. To increase the passband, especially in high-speed applications (e.g., 40 Gbps), the reflectivity should be made relatively low. Several stages can be cascaded to compensate over a large range of dispersion values. Thus, four to six port circulators or multi-stage cascaded C-lens dual fiber collimators can be used.

The reflectivity of the second reflective surface (e.g., surface 109) is generally different from the first surface. For a GTE to function ideally, the reflectivity of the second surface should be close to 100% over the spectral region of interest (e.g., about 1520 nm to about 1580 nm). Such high reflectivities, however, generally require many dielectric layer pairs, with each pair including one layer having a relatively high refractive index and one layer having a relatively low refractive layer. When the reflectivity of the second surface is less than 100%, loss in light efficiency can occur.

However, according to one aspect of the present invention, a reduction in the second surface reflectivity can be beneficial. In particular, a reduced reflectivity can act as a notch filter which, when properly designed, has the remarkable result of improved chromatic dispersion compensation.

As described more fully below, the ability to control the optical thickness of GTE is important. For example, to match the amplitude reflectance of the etalon with the ITU grid, the optical thickness of the optical filler should be precisely controlled so that the round transit time through the GTE is equal to the 1/(ITU grid spacing). The optical thickness is given by the product of the refractive index of the filler and the thickness of filler. For example, to properly match a GTE constructed from a BK-7 material to a 100 GHz ITU grid, the optical thickness should be 0.99871±0.005 mm. Also, in order for the GTE to function efficiently as an etalon, both reflective surfaces should be substantially parallel, preferably within about 0.5 arc seconds. High quality GTEs that can be used in accordance with this invention are available from Rocky Mountain Instrument, of Lafayette, Colo.

Figure 1:
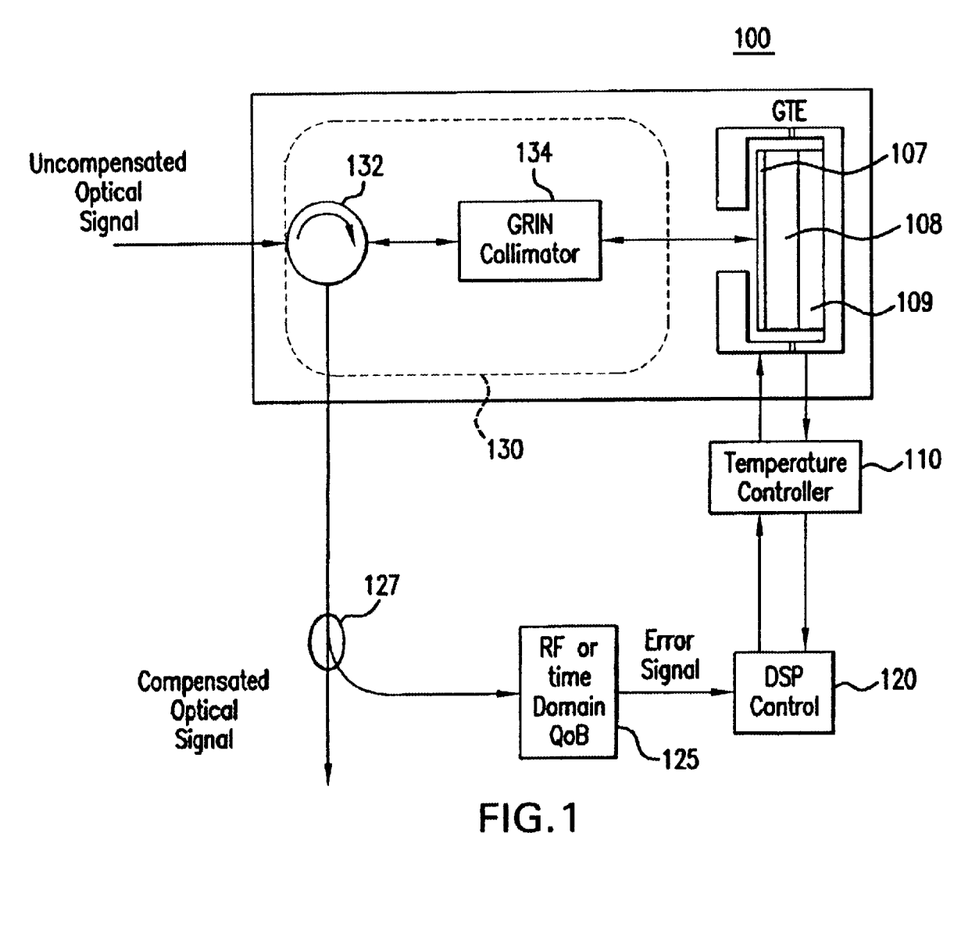
FIG. 1 shows a schematic of an illustrative chromatic dispersion compensator according to this invention.
Figure 2:
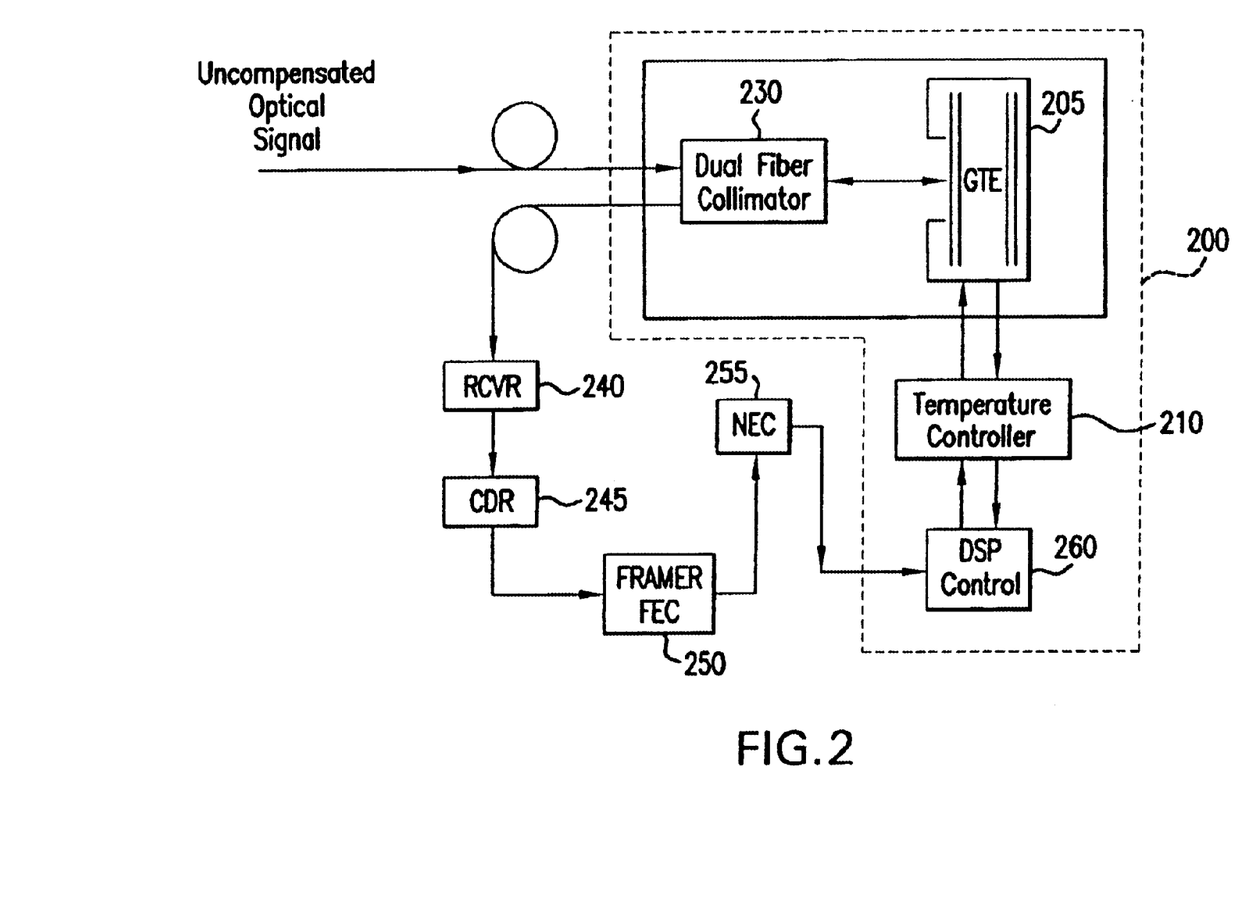
FIG. 2 shows a schematic of another illustrative chromatic dispersion compensator according to this invention.

Uncompensated light is provided to the GTE through a beam separator. As used herein, a beam separator is an optical device that can separate reflected light from incoming light. There are at least two types of optical beam separators that can be used according to this invention. FIG. 1 shows a first type of beam separator that includes circulator 132 and collimator 134. FIG. 2 shows a second type of separator that includes dual fiber collimator (hereinafter, "DFC") 230. Both types are discussed more fully below.

Figure 3:
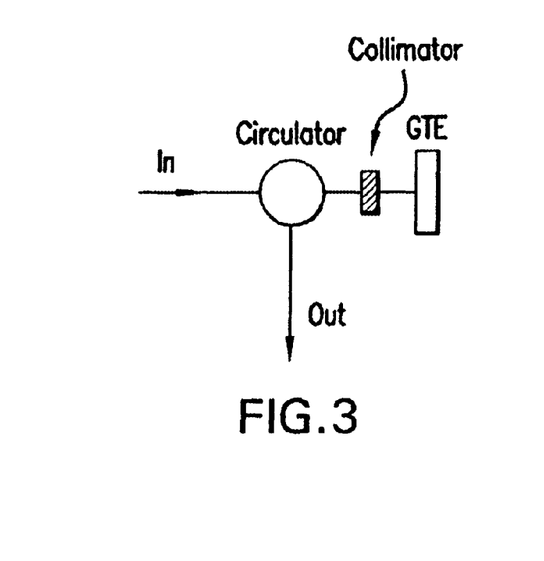
FIG. 3 shows a circulator that can be used according to this invention.

Circulators are compact and simple to use, yet they have a number of disadvantages. They are generally expensive (e.g., $1000–4000), have a high insertion loss (e.g., between about 1.0 dB without connectors and about 2.5 dB with connectors), and have a noisy output due to multiple reflections from many optical components). Fiber circulators are available from various companies including OpLink Communications, Inc. of San Jose, Calif., New Focus, Inc., of San Jose, Calif., JDS Uniphase Corporation, of San Jose, Calif., and Newport Corporation, of Irvine, Calif. As shown in FIG. 3, a collimator can be placed between the circulator and the GTE.

In contrast to circulators, DFC's are generally inexpensive (e.g., $42) and exhibit a low insertion loss (e.g., 0.25 dB) and a low return loss (e.g., 60 dB). Also, due to the device's simple structure, a clean output, with little noise due to interference, can be obtained.

There are at least two different types of commercially available DFCs that can be used in accordance with this invention: (1) a C-lens DFC and (2) a GRIN DFC. In both cases, a beam angle of about 3 degrees is normally required between the incident and reflected beams. This beam angle, however, can cause "walkoff" between multiple reflections and polarization dependent loss (hereinafter, "PDL"). As a result, spectral reflectance is non-uniform and eye performance can be degraded. Because the Insertion Loss (IL) of a DFC strongly depend on the distance between a collimator and a GTE, it will be appreciated that a beam that has been repeatedly reflected from a GTE that is 1 mm thick, for example, should not escape the aperture of the collimator. DFCs that can be used according to this invention are available from Koncent Communications, Inc. and CASIX, Inc., both of Fuzhou, Fujian, China.

Figure 4:
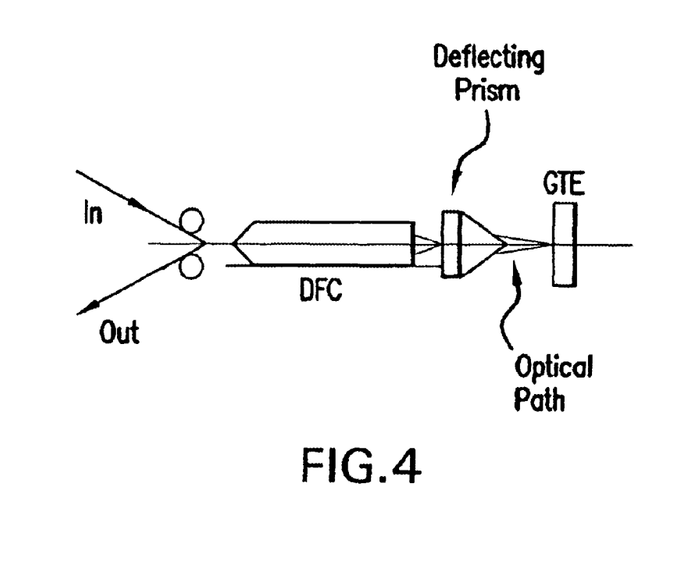
FIG. 4 shows a dual fiber collimator that can be used according to this invention.

FIG. 1 shows how circulator 132 and collimator 134 can be used in combination as beam separator 130 in CD compensator 100. FIG. 2 shows how DFC 230 can be used as a beam separator in CD compensator 200. FIGS. 3 and 4 provide magnified views of how separators 130 and 230, respectively, function. As shown In FIG. 3, a collimator can be placed between the circulator and the GTE. As shown in FIG. 4, a deflecting prism can be placed between the DFC and the GTE.

FIG. 1 also shows how compensator 100 can be used at a terminal or mid-span element of an optical communications network. During operation, an uncompensated light beam is provided to circulator 130, which passes the light beam to collimator 134, which collimates the uncompensated light and provides it to GTE 105. The beam illuminates GTE 105 and the reflected light is suitably delayed to compensate for chromatic dispersion at a particular wavelength.

The reflected light passes back through collimator 134, which directs the reflected light toward an optical receiver (not shown). Optical tap 127 provides some compensated light to optical distortion analyzer 125, which includes a photodetector and an analyzer capable of determining an objective metric of the amount of CD in the light signal. The metric, which can be, for example, an error signal, is provided to DSP controller 120. Controller 120 generates control signals used to tune GTE 105. One type of GTE controller is temperature-based (e.g., controller 110). Various control schemes are discussed more fully below.

FIG. 2 shows another illustrative embodiment of CD compensator 200, which can also be used at a terminal or mid-span element of an optical communications network. During operation, uncompensated light is provided to one of the two inputs of DFC 230, which collimates the uncompensated light. Like compensator 100, the collimated beam illuminates GTE 205 and the reflected light is suitably delayed to compensate for chromatic dispersion at a particular wavelength.

The compensated light is then provided to receiver 240, which normally includes a detector and an electronic amplifier. Receivers that can be used according to this invention include, for example, the one sold under Model 1014 by New Focus, Inc., of San Jose, Calif. and 10 Gbps High Sensitivity Avalanche Photodiode Rx, available from Epitaxx, of West Trenton, N.J. (now owned by JDS Uniphase, Inc.).

CDR 245 recovers data and clock signals from the incoming bit stream originally carried by the compensated light signal and later processed receiver 240. CDRs that can be used are available from Applied Micro Circuits Corp., of San Diego, Calif.

Framer FEC 250 multiplexes/demultiplexes the serial data supplied from the user interface into frames, generates and checks Reed-Solomon FEC bytes, performs interleaving functions, and encodes/decodes the frames to produce data for the modulators.

Network element controller (hereinafter, "NEC") 255 can be used to inform customers of intrusive facility and hardware alarm events, including threshold (e.g., performance) alarms pertaining to their networks services. In addition to the capture and display of intrusive and performance-based network events, NEC 255 can continually monitor its interface links to network elements. It can also provide an alert signal if that continuity is lost or impaired. Together, Framer FEC 250 and NEC 255 generate an error signal to evaluate quality of bits in addition to other functions. A slow speed signal is provided to digital signal processor (hereinafter, "DSP") 260 to generate temperature control signals for controlling GTE 205, and, thereby, for compensating CD.

Any objective feedback metric, such as a portion of an RF spectrum, an error function (such as a bit error rate), or a "quality-of-bit" (hereinafter, "QoB") signal, can be used for performance monitoring and feedback control during dispersion compensation. Once obtained, the metric can be optimized using any suitable optimization algorithm, such as the steepest descent method (or any variant thereof), by dithering one or more variables. The generation of performance metrics, however, normally requires expensive high-speed analog devices, making the manufacture of a CD compensator costly. Also, many algorithms have limitations, such as trapping in local minima.

Three embodiments for feedback control optimization according to this invention are provided below.

In a first embodiment, an error signal generator—instead of the expensive RF QoB or time-domain QoB—can be used to monitor a B2 byte in a SONET frame. The B2 byte calculates the parity check based on all bits of the previous frame prior to scrambling. The speed of B2 is rather slow since the redundant overhead bit appears every 15 bits or so. It can still, however, be used for CD compensation because high speeds are not required.

In another embodiment, a high-speed ASIC (e.g., SiGe) capable of generating clock and data recovery and bit error rate signals at high speeds can be used. The chip can be a low-cost compact error signal generator, can include a clock and data recovery unit, and preferably is SONET compatible.

In a third embodiment, an improved dispersion optimization algorithm can be used. Conventional dispersion optimization algorithms are often limited by the existence of local minimum traps. These traps can be a particular problem in GTE-based CD compensators, where the objective metric varies little and can be strongly affected by noise. Unfortunately, these traps often prohibit the discovery of and convergence to a global minimum.

To avoid this problem, the following four features can be included in an algorithm for finding an efficient search for a global minimum.

The first way of improving the discovery of and convergence to a global minimum is to estimate the potential surface before CD compensation. The potential function of a GTE-based CD compensator can be estimated by performing a numerical simulation or a preliminary search. The estimated potential profile can then be stored in a look-up table, for example, that could be in a DSP chip. Alternatively, the data could be described by an analytical function, whose coefficients are stored in a similar fashion. Since there may only be several variables (typically one to three), initial search of the overall profile would not be time-consuming. Examples of variables that can be searched include temperature or the electric field applied to each of the cascaded GTEs.

The second way of improving the discovery of and convergence to a global minimum is to utilize the periodic nature of the potential surface, the period of which corresponds to the free spectral range of the GTE. For example, because the group delay of a GTE varies periodically as a function of wavelength, one can vary a parameter (e.g., temperature or applied electric field) in either direction to achieve the same optimal value. Thus, uni-directional searches, especially at the initial stage of a search, can be performed—without concern that the value of the variable is being varied in the wrong direction.

The third way of improving the discovery of and convergence to a global minimum is to reduce noise by smoothing the potential surface. Smoothing can be achieved by averaging the objective metric over a relatively long period of time.

The fourth way of improving the discovery of and convergence to a global minimum, and to avoid being trapped in a local minimum, is to simulate the process of "annealing." In this method, random noise is applied to the potential function to effectively "shake" the potential surface. Then, the magnitude of the noise is gradually decreased until a global minimum is found.

Any of the above-identified feedback control methods can be used to provide feedback to the GTE, so that it can be tuned continually for adaptive compensation of CD. Although only two types of tuning (i.e., temperature controlled and electro-optically controlled) are described herein below, it will be appreciated that any tuning method can be used in accordance with this invention. Again, a CD compensator according to this invention need not be tunable.

Because speed is not generally an issue during CD compensation, temperature can be used to tune the GTE. When the GTE is temperature controlled, the optical filler should have a high thermal coefficient of expansion. Conventional glass materials, such as fused silica and BK-7, can be used, but BK7 can be preferable because it has a higher thermal coefficient of expansion and therefore requires a narrower range of tunability.

Accordingly, compensators 100 and 200 include temperature control apparatus 110 and 210, respectively, for controlling the temperature of GTEs 105 and 205, respectively. Temperature control apparatus can include, for example, a temperature sensor (such as a resistance temperature detector) near the GTE, temperature control circuitry, and either a heating device (e.g., resistive heating element), a cooling device (e.g., air cooling device), or preferably both.

Temperature control apparatus can use an analog control loop to reach the desired temperature without significant overshoot. When the GTE filler has a high coefficient of thermal expansion, precise and accurate temperature control (e.g., of up to 0.01 C) is more easily obtained.

In addition to temperature-control-based tuning, polarization-independent electro-optic tuning methods are also provided according to this invention. In general, however, electro-optic tuning is polarization-dependent. To avoid this dependence, polarization diversity can be used. According to this technique, the incoming beam is separated into two orthogonal polarization components, separately processed, and then recombined. Polarization diversity, however, normally requires a complicated optical structure and, thus, is not always highly desirable.

One solution, then, involves the use of a uniaxial crystal whose c-axis is substantially along the light propagation direction and in which the applied voltage is substantially along the c-axis. By using a suitable material, such as lithium niobate, both TE and TM polarization components can be made to experience the same amount of birefringence, thereby relaxing the polarization-dependence.

Two guidelines for achieving electro-optic polarization-independent tuning are provided below.

The first guideline is to permit tuning of wavelength over the entire free spectral range (hereinafter, "FSR"). To do this, the refractive indices along the two principal axes (e.g., normal to the beam propagation direction) should be variable (i.e., tunable) so that the optical path difference (i.e., $\Delta(nd)$) in the GTE resulting from an applied electric field changes monotonically up to one half the wavelength:

$$\Delta(n \cdot d) = \lambda/2,$$

where n is the refractive index of the etalon, d is the thickness of the etalon, and $\lambda$ is the wavelength of light. If thickness does not change appreciably over the surface of the etalon, the equation can be rewritten as:

$$\Delta n \cdot d = \lambda/2,$$

where $\Delta n$ is an increment in refractive index due to an applied electric field.

The second guideline, which can be used to avoid polarization dependence, involves making the refractive indices along the two orthogonal polarization directions (say, x and y) substantially the same ($n_x \cong n_y$), regardless of the magnitude of the applied voltage.

Four embodiments of substantially wavelength-independent electro-optic controlling schemes according to this invention are provided.

In a first embodiment, an electro-optic crystal with a 3m-symmetry group (e.g., lithium niobate) can be used with an electric field applied, and the light beam propagating, along its c-axis (longitudinal configuration).

According to this embodiment, an electric field is applied along the c-axis (i.e., $\vec{E} = E\vec{z}$) of the electro-optic crystal. Thus, the refractive indices along the three principal axes (i.e., x, y, and z) are given by:

$$n_x = n_o - \frac{1}{2}n_o^3 r_{13} \cdot E,$$

$$n_y = n_o - \frac{1}{2}n_o^3 r_{13} \cdot E$$

$$n_z = n_e - \frac{1}{2}n_e^3 r_{33} \cdot E$$

where $n_o$ and $n_e$ are the ordinary and extraordinary refractive indices of the crystal, respectively, $r_q$'s are electro-optic coefficients, and E is the applied electric field. It will be appreciated that $n_x = n_y$, and both indices vary linearly with the electric field E, satisfying the second guideline. The required voltage to satisfy the first guideline is given by:

$$V = \frac{\lambda}{r_{13} \cdot n_o^3}.$$

For a lithium niobate crystal with $r_{13} = 9.6 \times 10^{-12}$ m/V and $n_o = 2.3$ at $\lambda = 1.55$ μm, V=13.3 kV.

It will further be appreciated that the application of an electric field along the c-axis of the uniaxial crystal does not guarantee that the above guidelines are satisfied. For example, some of the uni-axial crystals become bi-axial ($n_x \neq n_y$) when subjected to an electric field in the direction of their optic axes (e.g., c-axis). Such crystals include tetragonal crystals (e.g., $-42$ m crystal, such as KDP and ADP) or cubic crystals (e.g., $-43$ m crystal, such as GaAs, CdTe and InAs).

In a second embodiment, an electro-optic crystal with a $\vec{4}3$ m symmetry group can be used with an electric field applied normally to the (111) plane ($E_x = E_y = E_z = E/\sqrt{3}$), and light propagating along the z' (i.e., the electric field direction)(longitudinal configuration).

The $\vec{4}3$ m symmetry group has a cubic structure ($r_{41} = r_{52} = r_{63}$ and all other coefficients are 0) and many of semiconductor materials (e.g., CdTe, GaAs, ZnSe and GaP) and $Bi_{12}SiO_{20}$ (hereinafter, "BSO") belong to this category. If an electric field is applied along a direction normal to the (111) plane, the refractive indices along the new principal axes (x', y' and z') become:

$$n_{x'} = n_o + \frac{1}{2\sqrt{3}}n_o^3 r_{41} \cdot E,$$

$$n_{y'} = n_o + \frac{1}{2\sqrt{3}}n_o^3 r_{41} \cdot E, \text{ and}$$

$$n_{z'} = n_o - \frac{1}{\sqrt{3}}n_o^3 r_{41} \cdot E.$$

The voltage required to satisfy the second guideline is given by:

$$V = \frac{\lambda}{\sqrt{3} \cdot r_{41} \cdot n_o^3}$$

For BSO crystals with $rn^3 = 82 \times 10^{-12}$ m/V and n=2.54, the voltage becomes 10.9 kV.

Both of the above-identified embodiments require substantially, and in some cases prohibitively, high voltages. Also, the transverse electric field configuration (which is commonly used for reducing operational voltage by increasing the length of the crystal) cannot be used in this application because it breaks symmetry between the two polarization directions. Thus, embodiment No. 3, which is described immediately below, lowers the required voltage by using the quadratic Kerr effect.

In a third embodiment, an isotropic medium can be used such that the light beam propagates along the same direction as the electric field (i.e., a longitudinal configuration).

Normally, an isotropic medium exhibits no linear electro-optic effect because the linear electro-optic coefficients are equal to zero. When an electric field is applied to an isotropic medium, however, the medium becomes birefringent due to the quadratic Kerr effect. As a result, the medium behaves uniaxially, in which the electric field defines the optic axis of the medium. The quadratic electro-optic coefficients of an isotropic medium are given by:

$$s_{11} = s_{22} = s_{33}, s_{12} = s_{13} = s_{21} = s_{23} = s_{31} = s_{32}, s_{44} = s_{55} = s_{66} = 0.5 \cdot (s_{11} - s_{12}).$$

When the z-axis is chosen to be in the direction of the electric field, the index ellipsoid is given by:

$$\left(\frac{1}{n^2} + s_{12}E^2\right) \cdot x^2 + \left(\frac{1}{n^2} + s_{12}E^2\right) \cdot y^2 + \left(\frac{1}{n^2} + s_{11}E^2\right) \cdot z^2 = 1.$$

The refractive indices along the new principal axes (i.e., x, y and z) then become:

$$n_x = n - \frac{1}{2}n^3 s_{12} \cdot E^2,$$

$$n_y = n - \frac{1}{2}n^3 s_{12} \cdot E^2$$

$$n_z = n - \frac{1}{2}n^3 s_{11} \cdot E^2$$

where x, y and z are the new principal axes, and where z is the direction of the applied electric field. It will be appreciated that $n_x = n_y$ and that both of these indices change monotonically (i.e., quadratically) with the applied electric field E, which satisfies the second guideline. The required voltage to satisfy the first guideline is given by:

$$V = \sqrt{\frac{\lambda \cdot d}{n^3 \cdot s_{12}}}.$$

The free spectral range (hereinafter, "FSR") corresponding to the ITU grid spacing is related to thickness d as follows:

$$FSR = \frac{1}{\tau} = \frac{c}{2 \cdot n \cdot d}$$

Combining the prior two equations then yields:

$$V = \sqrt{\frac{c\lambda}{2 \cdot \pi^4 \cdot s_{12} \cdot FSR}}.$$

Thus, V equals about 513 Volts for PLZT, which has n=2.45, $s_{12}$=2.4×10$^{-16}$(m/V)$^2$ when the FSR=100 GHz, λ=1550 nm. Fortunately, 513 Volts can be easily provided with commercially available PZT drivers (for instance, PZD-700-2-L from Trek Inc.).

Figure 6:
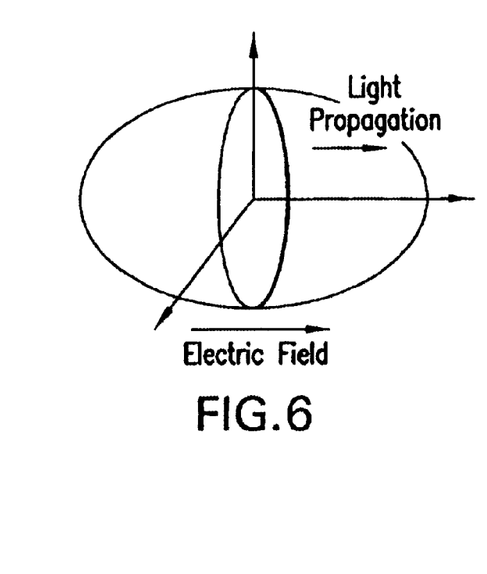
FIG. 6 shows the relative orientations of an applied electric field, the beam propagation direction, and the indices of refraction of an optical filler of a GTE according to this invention.

As shown in FIG. 6, all three of the above-described embodiments for electro-optic tuning have the electric field oriented along the light propagation direction ("longitudinal") to preserve symmetry between the two orthogonal polarization directions x and y for any amount of electric field.

Figure 5:
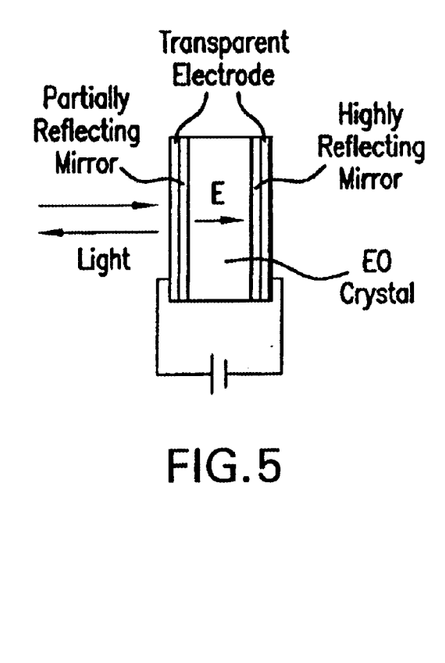
FIG. 5 shows a side view, partially cross-sectional and partially schematic, of an illustrative GTE according to this invention.

In this case, both electrode surfaces need to be coated with substantially transparent electrodes, such as indium tin oxide (hereinafter, "ITO") as shown in FIG. 5. ITO, however, can absorb a significant amount of light. Absorption can be reduced by either reducing the thickness of the ITO (while preserving the function of an electrode) or by treating the ITO so that the plasma resonant wavelength of the ITO (e.g., about 2.3 microns) is shifted well away from optical wavelength of interest (about 1.55 micron regions) by adding a special alloy material to the ITO.

Another method to reduce absorption is to provide an aperture in the electrode for the light beam. But, such an approach tends to cause unwanted non-uniform electric fields along the light path and is therefore not highly desirable. Fortunately, ITO electrode absorption can be reduced to less than 1% with the recent advances in ITO coating technology.

And, in a fourth embodiment, a liquid crystal Fabry-Perot etalon can be used. The liquid crystal has been extensively studied as a means of a tunable filter based on Fabry-Perot etalons. To avoid polarization diversity, a polymer-dispersed liquid crystal (hereinafter, "PDLC") can be used to achieve substantial polarization independence. It is believed, however, that PDLC may have an optical absorption (e.g., scattering) problem associated with it.

To reduce loss due to scattering in a PDLC device, the size of the liquid crystal drops should be controlled. This is because when the physical dimensions of the liquid crystal drop are on the same order as the incident light wavelength, strong scattering can attenuate the light considerably. By reducing the drop size, the scattering loss will be reduced. The formation of the PDLC structure is a chemical reaction-induced phase segregation. So, by controlling the chemical reaction speed, one can control the formation of the PDLC structure.

As mentioned above, a CD compensator according to this invention can include a notch filter. The bandwidth of the notch filter should be sufficient to filter one of the two side band of the modulated carrier frequency. Generally, there are two side bands associated with a modulated carrier signal. If the dispersion (i.e., in picoseconds per nanometer) in the system to be compensated is positive, then we can filter the high frequency side band. Similarly, if the dispersion (i.e., in picoseconds per nanometer) in the system to be compensated is negative, then we can filter the low frequency side band.

It will be appreciated that the filtering can be partial or complete. For example, if the dispersion impairment of an optical signal is not severe, then the amount of filtering can be reduced. On the other hand, if the amount of dispersion is substantial, additional filtering is preferable.

An optical notch filter can be formed in at least two different ways according to this invention. The first way is to reduce the reflectivity of the back reflector of the etalon to less than 100%. Preferably, the reflectivity of the back reflector is between about 75% and 100%. More preferably, the reflectivity of the back reflector is between about 90% and 100%. Most preferably, the reflectivity of the back reflector is between about 95% and 100%. The reflectivity of the front reflector is preferably between about 25% and 75%. This integrated technique of forming an integrated optical notch filter (e.g., using any of the well-known reflective coating methods) is especially useful when a circulator-based compensator is used.

The second way to form an optical notch filter is to by using a DFC by properly positioning it with respect to the front reflector of the etalon. Because the optical paths emerging from a DFC are not parallel, the paths cross at some fixed distance from the end of the DFC. Thus, according to this invention, at least the front reflector of the etalon should be located between the DFC and the crossing point. Preferably, depending on the physical and optical dimensions of the device, both etalon reflectors can be inserted between the DFC and the crossing point.

When a DFC is used, its longitudinal axis (the axis parallel to the two attached optical fibers) should be substantially normal to the etalon face. As discussed above, a certain amount of walk-off occurs between multiple reflections and, as a result, the spectral reflectance can be non-uniform. This non-uniform reflectance, however, can be thought of as a frequency dependent filter—e.g., a notch filter. Thus, this walk-off technique advantageously forms an optical notch filter and can be especially useful when a DFC-based compensator is used.

It will be appreciated that chromatic dispersion compensation, including notch filtering, according to this invention can be electronic as well as optical. In the case of electrical notch filtering, the optical signal is first converted into an electrical signal. Then, filtering can be performed for certain frequency components, including, particularly, those frequencies that correspond to one of the modulated carrier frequency side bands.

Experimental Data

TABLE 1 lists IL and PDL measurements that were made for embodiment Nos. 1-3 (see above), using a sweep wavelength system (such as the one sold as part No. SWS15102, from the JDS Uniphase Corporation, of San Jose, Calif.). All the components are connected using either FC/PC or FC/APC (on the circulator) connectors. Return loss (hereinafter, "RL") is measured using a separate RL analyzer (also available from the JDS Uniphase Corporation, of San Jose, Calif.).

TABLE I

|  | Circulator + Collimator | C-lens DFC | GRIN-lens DFC |
|---|---|---|---|
| Insertion Loss (dB) | 2.90/1.5* | 0.5 | 0.5 |
| Polarization Dependent Loss (dB) | 0.28/0.2* | 0.045 | 0.05 |
| RL (dB) | 45 | 54 | 55 |
| Spectral-Reflectance non-uniformity (dB) | 0.12 | 4.0 | 12.0 |
| Eye performance | Best | Medium | Poor |
| Size | 10 mm × 60 mm × 6 mm | 5 mm dia × 10 mm | 5 mm dia × 10 mm |
| Cost ($) | 3,000 | 300 | 300 |

*Can be reduced using a better circulator and splicing.

Thus, a combination of a circulator and a collimator is highly desirable. Also, the IL and PDL values listed in TABLE I were measured with FC connectors. It is believed that splicing could reduce the losses by about 0.5 dB.

Also, the circulator used for TABLE I has a rather high loss unit compared with other commercially available ones, as compared below in TABLE II:

TABLE II

|  | JDS CR-2300 | Newport F-CIR-31550 | New Focus P0803-A |
|---|---|---|---|
| Insertion Loss (dB) | 0.6 | 1.0/1.3 | 0.5 |
| Polarization Dependent Loss (dB) | 0.05 | <0.20 | <0.15 |
| Size (mm) | 16 × 11 × 38 | 12 × 35 × 80 | 5.5 × 58 |
| Price ($) | 2500 | 3500 | 3000 |

Because the GTE alone has negligible IL and PDL, the IL of a circulator-based GTE is mainly due to the circulator. Thus, selection of a good circulator could reduce IL and PDL of a CDC to less than 0.5 dB and 0.15 dB, respectively.

Figure 7:
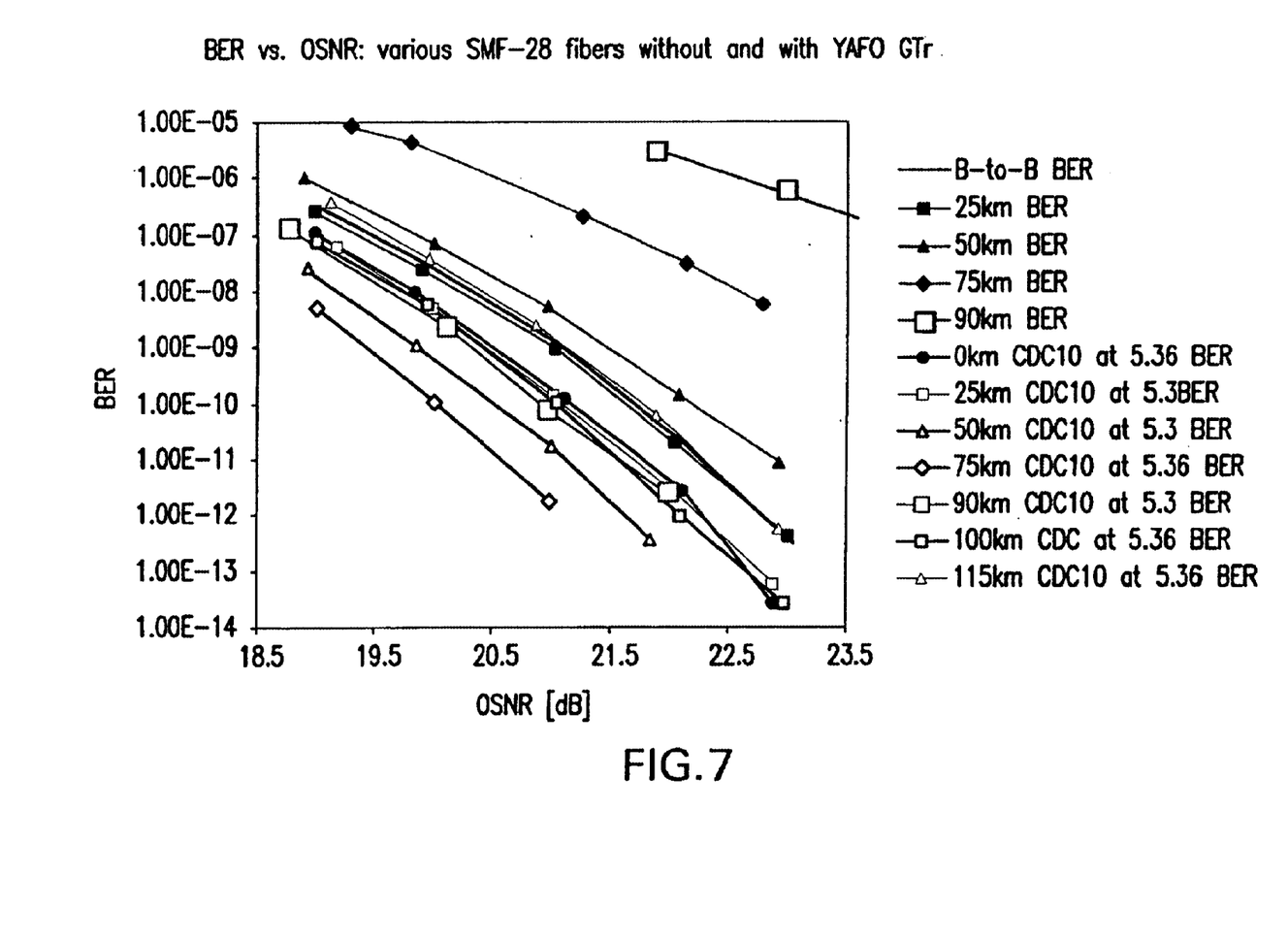
FIG. 7 shows how the bit error rate varies with optical signal to noise ratio for various optical fiber transmission lengths, with and without a chromatic dispersion compensator including a notch filter according to this invention.

In addition to TABLES I and II, FIG. 7 shows how the bit error rate varies with optical signal to noise ratio for various optical fiber transmission lengths, with and without a chromatic dispersion compensator (including a notch filter) according to this invention. Remarkably, the compensated transmission data are not only better than the uncompensated transmission data for transmission lengths between 25 km and 100 km, the compensated data are actually better than the data in which the length is essentially zero—that is, the transmitter and receiver are placed back-to-back.

Figure 8:
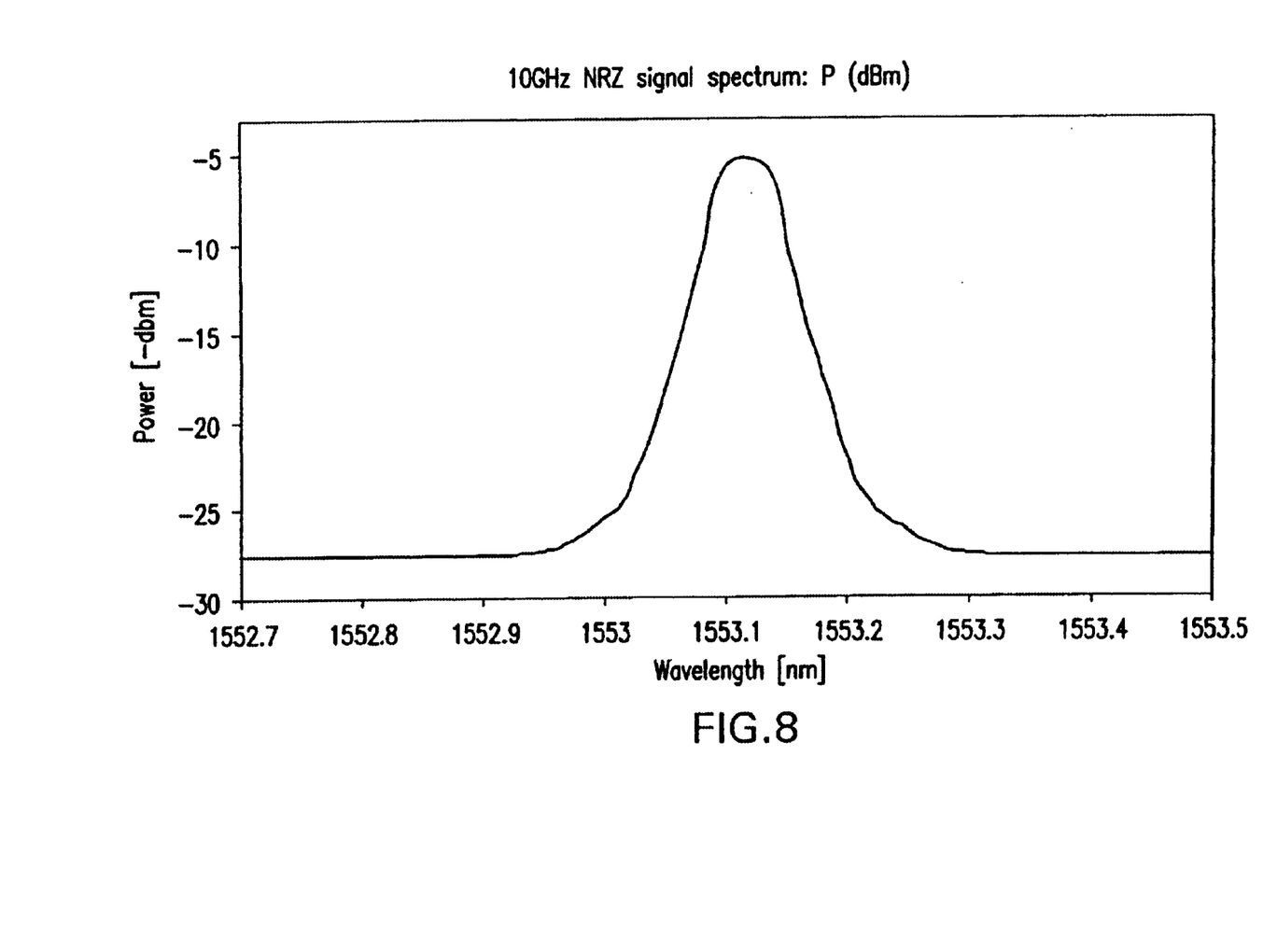
FIG. 8 shows a 10 Gbps NRZ pseudo random bit stream having a 31-bit length test signal used to generate the data shown in FIG. 7.
Figure 9:
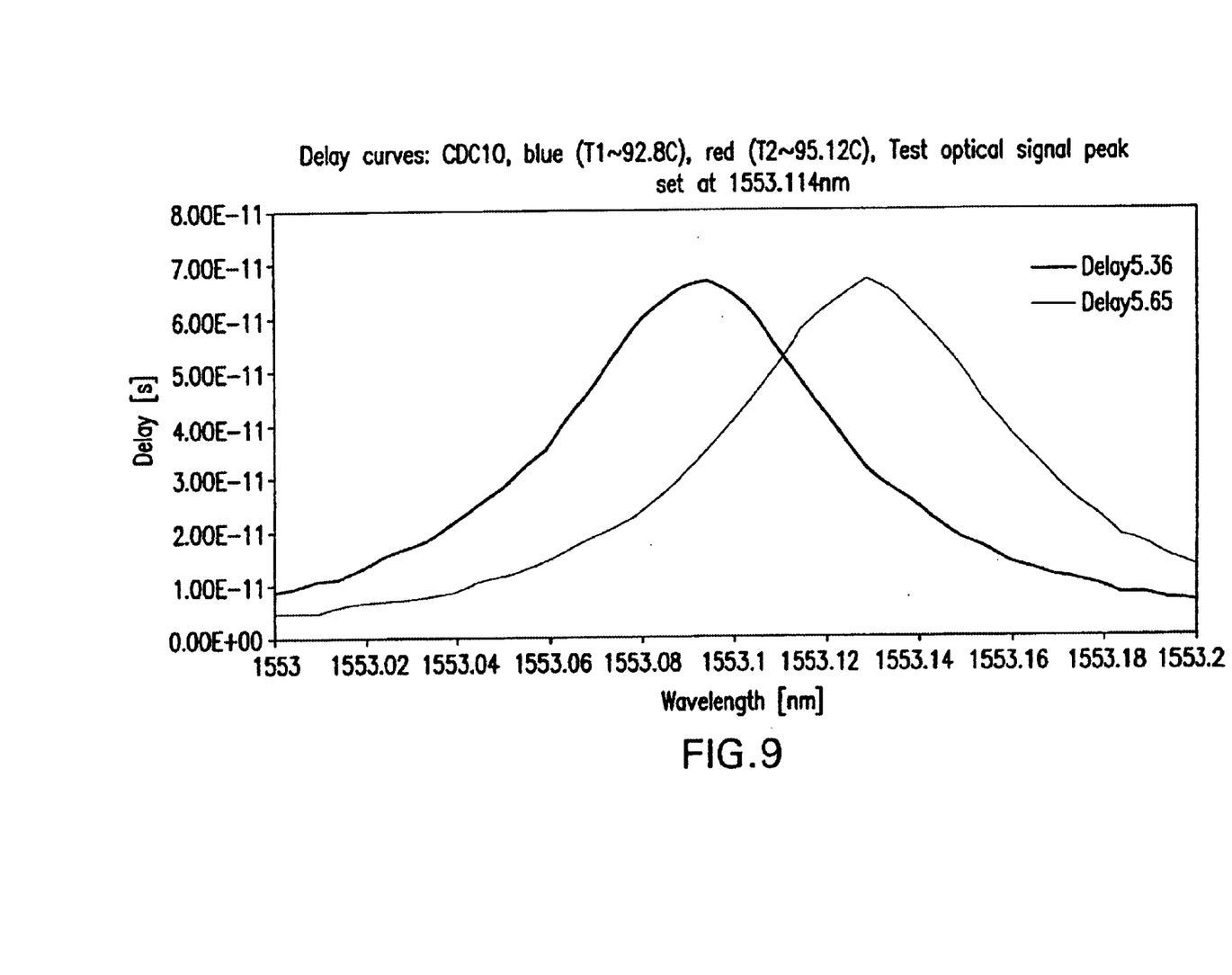
FIG. 9 shows two delay curves (for different temperatures) of a GTE for compensating positive and negative dispersion with the same test signal according to this invention.

FIG. 8 shows the test signal spectrum, which was a 10 Gbps NRZ pseudo random bit stream having a 31 bit length ("PRBS31"), with a peak power wavelength of 1553.114 nm. It will be appreciated that the same method according to this invention can be used to compensate for chromatic dispersion in an RZ bit stream. FIG. 9 shows two delay curves (for different temperatures) of the GTE for compensating positive and negative dispersion with the same test signal. The first derivative of these delay curves is the corresponding dispersion curve.

Figure 10:
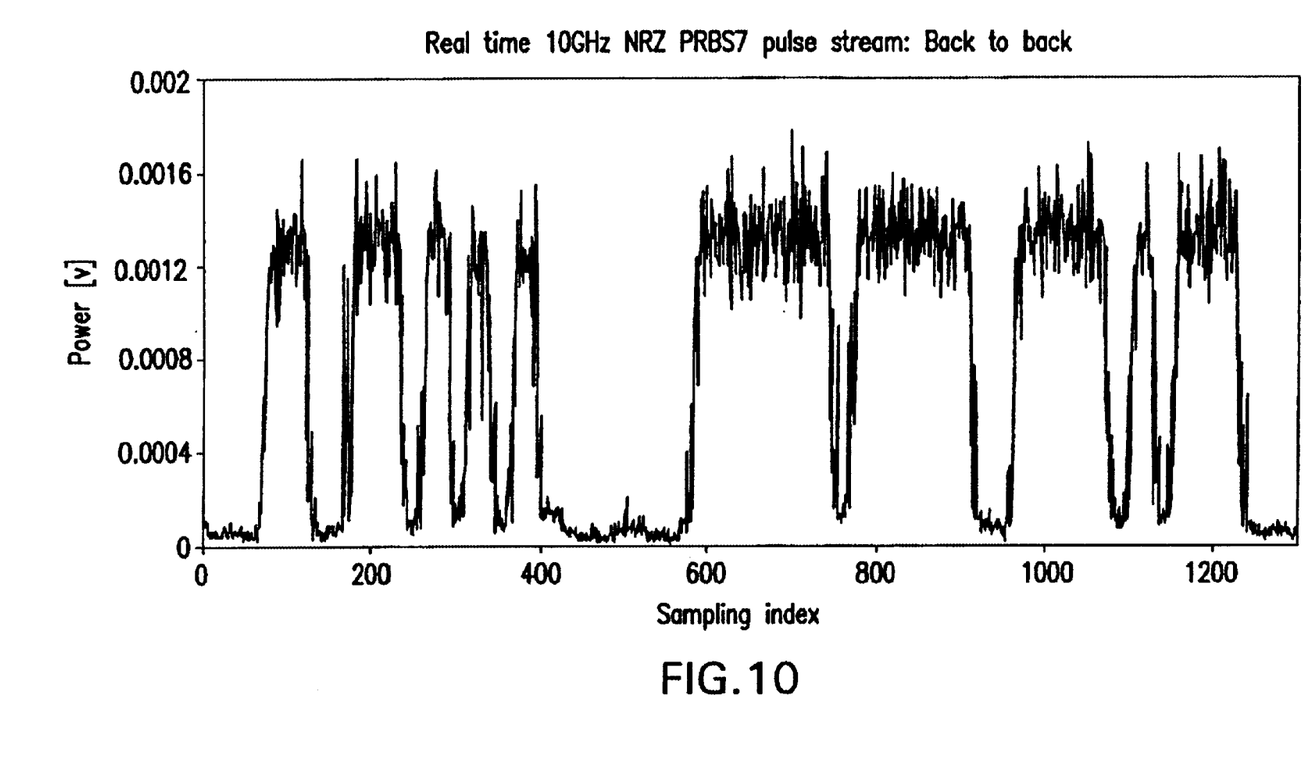
FIG. 10 shows a real-time 10 Gbps NRZ PRBS7 pulse stream for a back-to-back test configuration.
Figure 11:
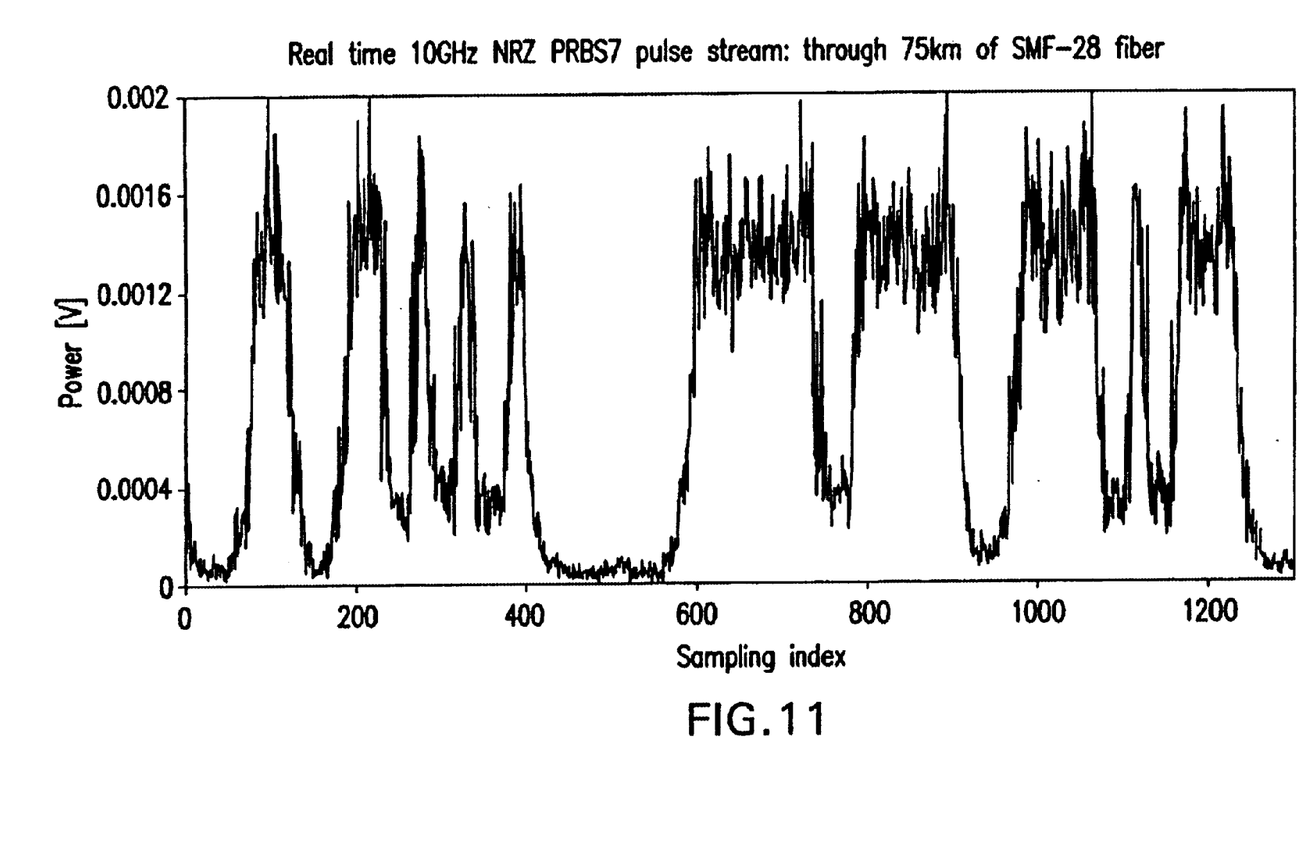
FIG. 11 shows the effect of adding 75 km of SFM-28 fiber between the transmitter and receiver used in the test configuration of FIG. 10.
Figure 12:
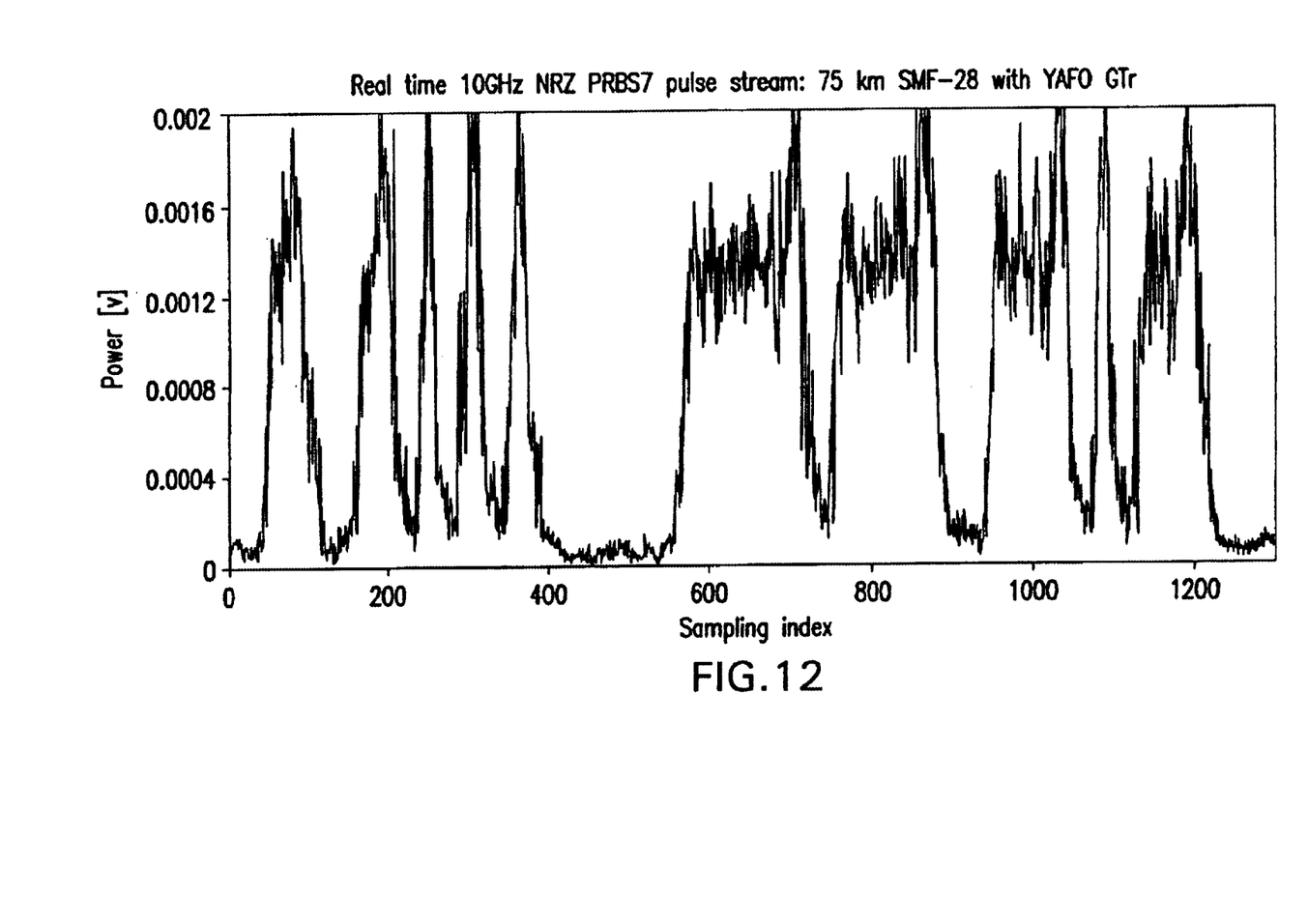
FIG. 12 shows the effect of adding a CD compensator according to this invention before the receiver used for the data shown in FIG. 11.

FIG. 10 shows a real-time 10 Gbps NRZ PRBS7 pulse stream for the back-to-back configuration discussed above. FIG. 11 shows the effect of adding 75 km of SFM-28 fiber between the transmitter and receiver when the optical power at the receiver is regulated at −8.0 dBm. It will be appreciated that the low or "0" levels are noticeably higher when compared to the back-to-back case. FIG. 12 shows what happens when a CD compensator according to this invention is added before the receiver. In particular, the high or "1" levels are noticeably higher, even while the low or "0" levels remain essentially the same.

One skilled in the art will appreciate that the present invention can be practiced by other than the described embodiments, which are presented for purposes of illustration and not of limitation. It will be further appreciated that the present invention is limited only by the claims that follow.

What is claimed is:

1. A chromatic dispersion compensator comprising:
   a Gires-Tournois etalon (GTE) with an integrated notch filter;
   an optical beam separator;
   a GTE controller
   an optical distortion analyzer; and
   a feedback controller.

2. A chromatic dispersion compensator comprising:
   chromatic dispersion compensation optics, including a Gires-Tournois etalon (GTE) with an integrated notch filter, receiving uncompensated optical signal from a beam separator and generating a compensated optical signal; and
   GTE controller responsive to a feedback signal derived from the compensated optical signal.

3. A chromatic dispersion compensator comprising:
   an etalon with a integrated notch filter;
   an optical beam separator;
   an etalon controller;
   an optical distortion analyzer; and
   a feedback controller.

4. A chromatic dispersion compensator comprising:
   an etalon
   an optical beam separator positioned to function as a notch filter
   an etalon controller;
   an optical distortion analyzer, and
   a feedback controller.

5. A chromatic dispersion compensator (CDC), comprising:
   an optical beam separator passing uncompensated optical signal to an etalon;
   wherein the etalon comprises an integrated notch filter comprising:
      a first reflector having a first reflectivity between about 25% and about 75%; and
      a second reflector having a second reflectivity that is substantially parallel with said first reflector, wherein second reflectivity is between about 75% and about 100%; and
   an etalon controller responsive to a feedback signal derived in a compensated optical signal generated by the etalon.

6. The CDC of claim 5 wherein said second reflectivity is greater than about 95%.

7. The CDC of claim 6 wherein said second reflectivity is greater than about 99%.

8. The CDC of claim 5, wherein the optical beam separator comprises a circulator and a collimator.

9. The CDC of claim 5, wherein the optical beam separator comprises a dual fiber collimator (DFC).

10. The CDC of claim 9, wherein DFC comprises one of a GRIN DFC or a C-lens DFC.

11. The CDC of claim 5, wherein the etalon controller comprises a temperature control apparatus responsive to a feedback signal.

12. The CDC of claim 11, wherein the feedback control circuit comprises an active tuning circuit.

13. The CDC of claim 12, wherein the active tuning circuit comprises:
   a Quality of Bit (QoB) circuit receiving a compensated optical signal from the eatlon and generating an error signal; and
   a digital signal processor receiving the error signal and generating the feedback signal.

14. The (CDC) of claim 12 wherein the active tuning circuit comprises:
   a receiver circuit receiving a compensated optical signal from the eatlon and generating a digital signal indicative of the compensated optical signal;
   a combination of Clock and Data Recovery (CDR) circuit, a Framer FEC circuit, and a Network Element Controller generating an error signal in relation to the digital signal from the receiver; and
   a digital signal processor receiving the error signal and generating the feedback signal.

15. The CDC of claim 5, wherein the etalon controller comprises a polarization independent, electro-optic tuning circuit.

16. The CDC of claim 15, wherein the polarization independent, electro-optic tuning circuit comprises an uniaxial crystal tunable across an entire free spectral range and having refractive indexes along two orthogonal polarization directions that are substantially the same.

17. The CDC of claim 5, wherein the feedback signal derived from a metric selected from a group consisting of a selected RF spectrum, a data bit error rate, a quality-of-bit signal, and a error signal derived in relation to a B2 byte in a SONET frame.

18. The CDC of claim 17, wherein the metric is optimized using an optimization algorithm.

19. The CDC of claim 18, wherein the optimization algorithm comprises method steps implementing at least one feature selected from a group consisting of:
   estimating the potential surface before chromatic dispersion compensation,
   varying a selected parameter to exploit a periodic nature of a potential surface,
   reducing noise by smoothing a potential surface, and
   stimulating an annealing process.

* * * * *